COLD CATHODE INDICATOR DEVICE WITH MEMORY ELECTRODE

Filed June 29, 1962 4 Sheets-Sheet 1

INVENTOR
GEORGE A. KUPSKY
BY Robert A. Green
ATTORNEY

INVENTOR.
GEORGE A. KUPSKY
BY Robert A. Green
ATTORNEY

INVENTOR.
GEORGE A. KUPSKY.
BY Robert A. Green
ATTORNEY

INVENTOR.
GEORGE A. KUPSKY
BY Robert A. Green
ATTORNEY

United States Patent Office 3,237,040

Patented Feb. 22, 1966

3,237,040

COLD CATHODE INDICATOR DEVICE WITH MEMORY ELECTRODE

George A. Kupsky, North Plainfield, N.J., assignor to Burroughs Corporation, Detroit, Mich., a corporation of Michigan Filed June 29, 1962, Ser. No. 206,371
19 Claims. (Cl. 313—109.5)

This invention relates to electro-optical indicator devices and, particularly, to cold cathode indicator tubes.

One type of cold cathode indicator tube found in the prior art includes a stack of cathode electrodes, in the form of numerals, letters, or the like, each of which is adapted to exhibit cathode glow. Tubes of this type, which are described generally in U.S. Patents No. 2,874,320 and No. 2,878,407, have proved eminently successful.

Another type of indicator device is known as a matrix device, and includes a plurality of co-planar light-producing elements or segments which are connected in different combinations, each providing a different character representation. Perhaps the most serious limitation in devices of this type is that undesirably complex external coding circuitry, multiple contact switches, or the like are required to provide the desired combinations of glow elements to represent characters.

None of the cold cathode gaseous indicator glow tubes of the prior art has "memory"; that is, none can initiate cathode glow with the application of an energizing signal pulse and maintain this cathode glow when the signal pulse has been removed.

Accordingly, the objects of the present invention are directed toward the provision of an improved indicator device, and particularly a cold cathode gaseous indicator device which has memory.

Briefly, an indicator device embodying the invention includes a matrix of separate and distinct light-producing elements, each of which includes a glow cathode and a plurality of energizing or actuating means associated with, and adapted to operate, each cathode. The actuating means are connected in different combinations within the device, each combination being adapted to energize a different combination of glow cathodes, each combination of glow cathodes being adapted to represent a different numerical or other character. Each light-producing element also includes auxiliary electrode means which causes each element to have memory.

The invention is described in greater detail by reference to the drawing wherein.

Figure 1:
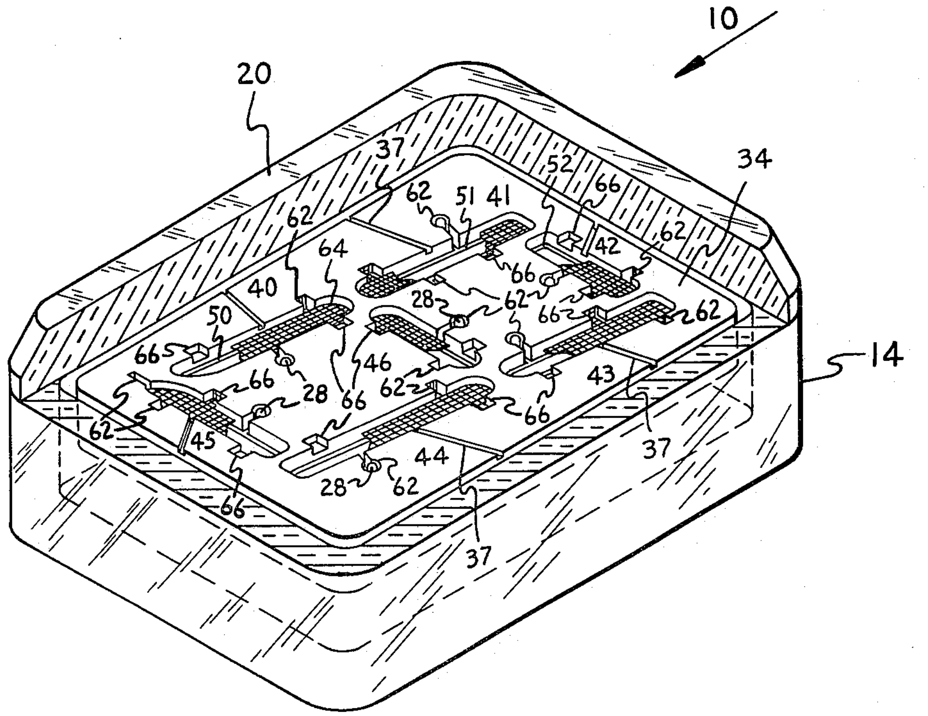
FIG. 1 is a perspective view, partly in section, of an indicator device embodying the invention.
Figure 2:
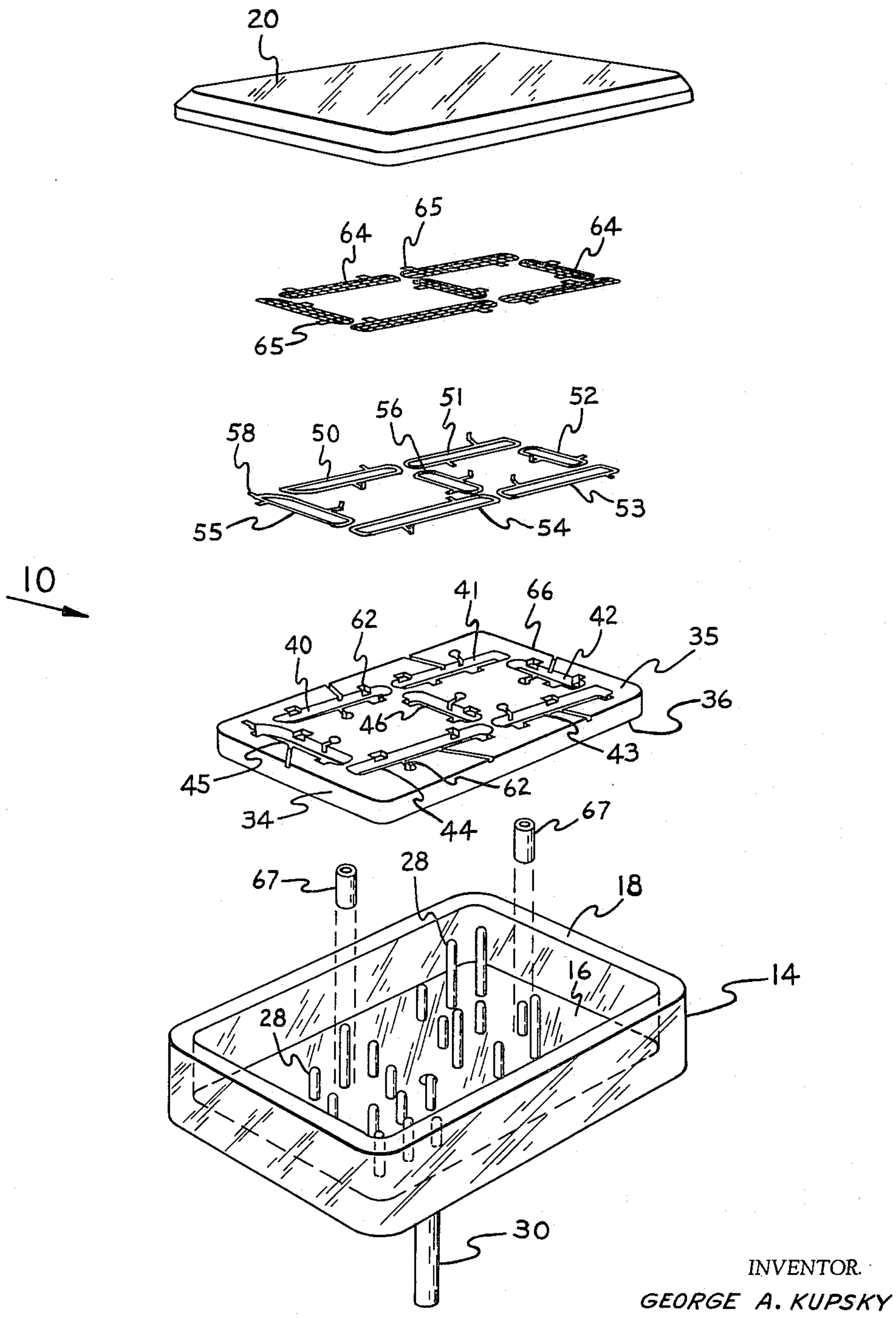
FIG. 2 is an exploded view of the device of FIG. 1.

Referring to FIGS. 1 and 2, an indicator tube 10, embodying the invention, includes a generally cup-shaped stem 14 having a base 16 and a side wall 18, and a light-transmitting face plate 20 which is hermetically sealed to the side wall of the stem. The stem 14 is of insulating material and its base carries a plurality of conductive pins 28 and a conventional tubulation 30, by means of which the tube may be exhausted and filled with gas such as neon. The tube 10 may have any suitable configuration, for example, it may be circular, rectangular, or the like.

The electrode assembly of the tube 10 comprises a matrix of light-producing elements or segments which are adapted to be combined in different ways to provide a plurality of different light-producing character representations. The particular form of the invention described is adapted to indicate numerals "0" to "9" and, for this purpose, includes seven segments arranged generally in a figure "8" pattern as shown. The detailed construction of tube 10 is as follows.

Inside its envelope, tube 10 includes a plate 34 of insulating material which has top and bottom surfaces 35 and 36, respectively, and is provided with seven channels 40, 41, 42, 43, 44, 45, 46, which contain the light-producing elements of the tube. The channels are generally rectangular as seen from above in FIG. 1 and are distinct and separate from each other and are adapted to be separately energized. Each channel in disk 34 includes a cold cathode glow electrode having a generally rectangular shape which conforms to the shape of its channel. Thus, cathodes 50 to 56 are provided in channels 40 to 46, respectively. Each cathode carries one or more tabs 58 which are seated in apertures 62 in the disk 34, one tab being electrically connected, by welding or soldering, to a pin 28 which enters the aperture 62. Electrical contact may thus be made through a pin 28 to each cathode. The cathodes are positioned in the channels 40 to 46 so that they all lie in the same plane or stratum for uniformity, and preferably, below the top surface 35 of the disk to allow a screen electrode 64 to be positioned over each cathode. Each screen includes tabs 65 which are seated in slots 66 in the top surface of the insulating disk.

Insulating spacer sleeves 67 of ceramic or the like are threaded on the pins 28 to provide a supporting base for the disk 34 and to cover the pins and prevent them from glowing. The top surface of disk 34 includes slots 37 which extend one from each channel to the edge of the disk. The slots 37 facilitate the flow of neon gas or the like into each channel during manufacture of the tube.

In a matrix-type tube such as tube 10, the cathodes are used in different combinations to provide the various desired numeral representations. Thus, for example, the cathodes 50 and 51 or 53 and 54 are used to represent numeral "1"; cathodes 52, 53, 56, 50, and 55 are used to represent numeral "2"; cathodes 52, 53, 56, 54, and 55 are used to represent numeral "3", and so forth.

In tube 10, the tube anodes 68 are used as the switching or selecting means for causing a selected cathode element or group of elements to glow and thus provide the desired character representation. Since each cathode is used more than once and in different combinations, a plurality of groups of anode elements are provided, with one group being associated with each cathode, and with a separate anode element being provided in each group for each time the associated cathode is used in a particular combination.

Figure 3:
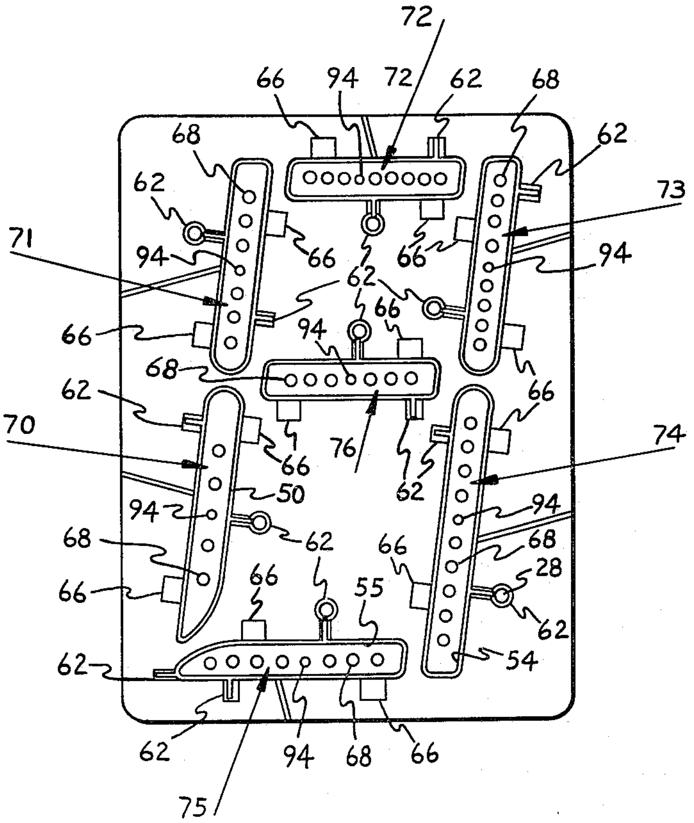
FIG. 3 is an enlarged plan view of a portion of the device of FIG. 1.

Referring to FIG. 3 which shows disk 34, the anode electrodes 68 are provided in the disk in groups, 70, 71, 72, 73, 74, 75, and 76, with one group of anodes being provided for, and associated with, each of the cathode electrodes 50 to 56, respectively. Thus, if cathode element 50 is used in making up four numerals, then four anodes 68 are provided in group 70 associated with the cathode 50. Similarly, if cathode element 52 is used in making up eight numerals, then eight anodes 68 are provided in group 72 associated with cathode 52, etc.

Figure 4:
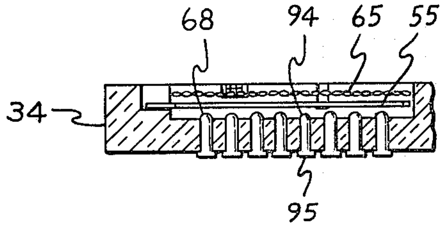
FIG. 4 is a sectional view of a portion of the device of FIG. 1.

The anodes 68 are designed and arrayed so that they are spaced substantially uniformly from the cathode with which they are associated in order to obtain substantially uniform glow starting potentials for the various cathodes. In tube 10, the anodes comprise pins seated in conductive holes which extend through the disk from the base of each channel. The upper ends of the pins extend a suitable distance above the base of the channel in operative relation with the associated cathode, and the lower ends lie flush with the lower surface 36 of disk 34 (FIG. 4). The portions of the anodes inside the channel may be provided with auxiliary cross members or other projections (not shown), if desired. Each hole which carries an anode pin is preferably metalized to insure good electrical contact with other contact means to be described.

Figure 5:
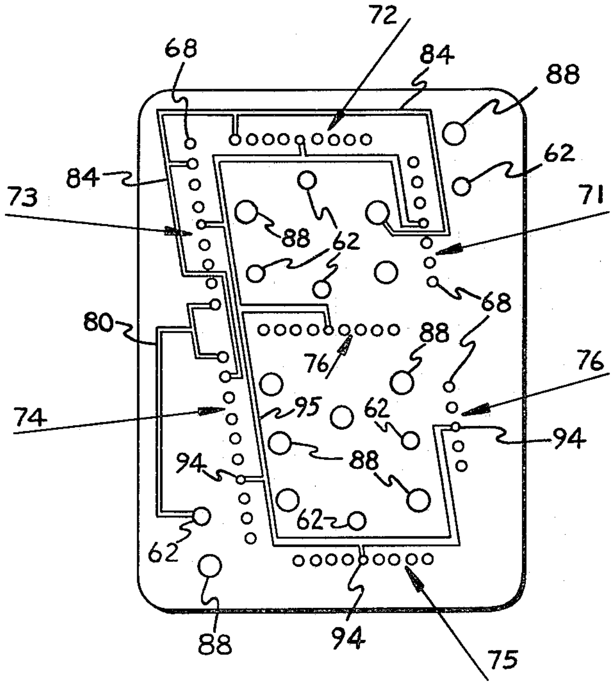
FIG. 5 is a plan view of the opposite surface of the portion of the device shown in FIG. 3.

Referring to FIG. 5, the various anode elements 68 of tube 10 are interconnected or programmed within the tube so that one anode group, comprising one or more anode pins, is provided for each character to be represented, and each anode group is adapted to be operated by the application of a single potential to a single tube pin. Thus, assuming for example, that cathodes 53 and 54 are used to represent numeral "1," then one anode element in group 73 is connected to one anode element in group 74 by means of a conductive printed circuit line 80 formed, preferably, on the bottom surface of plate 34. Similarly, assuming that cathodes 52, 53, and 54 are used to represent numeral "7," then anode pins in each of groups 72, 73, and 74 are connected together by conductive line 84. The anode pins are connected, in this way, in ten different groups to provide cathode representation of numerals "0" to "9."

Each lead 80, 84 and the others not shown extend to and coat depressions 88 formed in the bottom surface of the disk 34. The depressions are adapted to receive contact pins 28 carried by the stem 14.

According to the invention, the desired memory characteristic is provided in tube 10 by the inclusion of an auxiliary electrode 94 in each channel in disk 34. The auxiliary electrode operates in the nature of an anode, and, in one favorable construction, it comprises a pin which is secured in a metalized aperture in each channel. Preferably, the auxiliary pin, or memory pin, as it may be called, is positioned at the center of the row of anode pins, and, if desired, a purality of memory pins may be provided in each channel.

In order to provide memory, the auxiliary electrode pins 94 are operated as anodes, but they must have different electrical characteristics with respect to the cathodes than the anodes have. Specifically, the auxiliary electrodes should be less able to cause a cathode to glow than the associated anodes, but they should be able to sustain cathode glow once it has been initiated. In order to provide different electrical characteristics, the memory electrodes 94 may be made smaller in diameter than the anode pins 68 and/or they may be seated lower in their apertures so that they are less accessible to the cathodes with which they are associated than the anode pins. Alternatively, or in addition, the memory pin may be covered with a screen (not shown), or it may be coated with a layer of insulating material or the like. The memory pin might also be positioned beneath the lower surface of disk 34. One or more structural modifications of this type may be employed to affect the electrical characteristics of the memory electrodes and the potentials required for tube operation.

The memory electrodes are all connected together inside tube 10 by a line of conductive material 95 formed on the lower surface of the disk 34.

Figure 6:
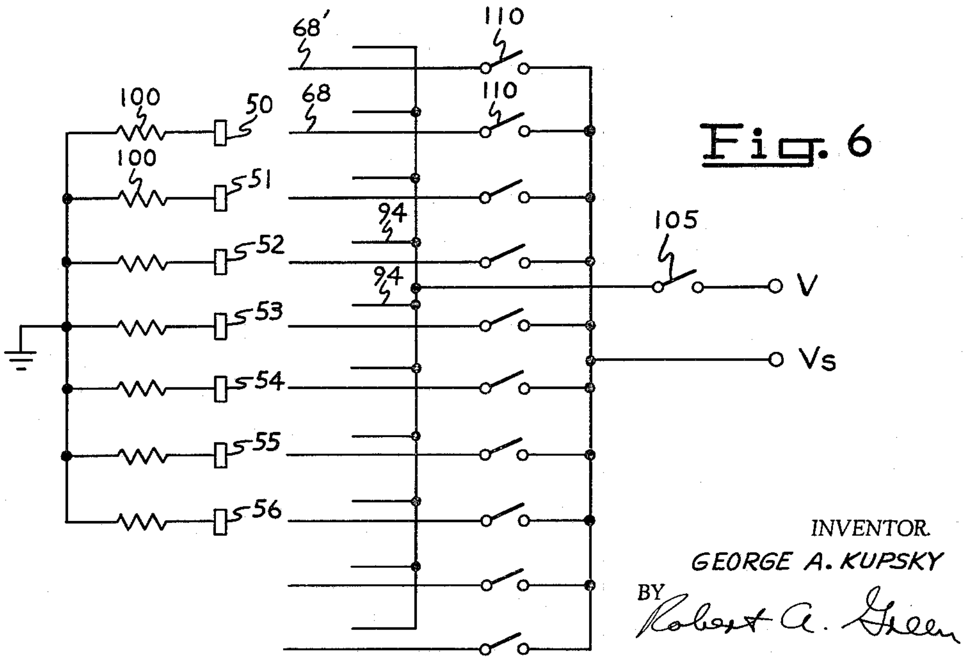
FIG. 6 is a schematic representation of the device of FIG. 1 and a circuit in which it may be operated.

Referring to the circuit shown in FIG. 6, in operation of the tube 10, a negative or ground potential is applied to all of the cathodes 50 to 56 through separate isolating resistors 100, and a positive potential V of perhaps 200 volts is applied through a switch 104 to all of the auxiliary memory electrodes. Because of the construction of the memory electrodes, this potential difference between the cathodes and the memory electrodes is insufficient to cause any of the cathodes to glow. Each group of anodes, represented by numeral 68', is also connected through a separate switch 110 to a source of energizing potential $V_s$ of perhaps 200 volts. Thus, with operating voltage applied to all of the cathodes and all of the memory electrodes, if a selected anode switch 110 is closed, a particular group of anodes is energized and causes the associated cathodes to exhibit cathode glow. Once the cathodes have been caused to glow, the energizing voltage $V_s$ on the anodes may be removed, and the glow will be sustained by the potential on the memory electrodes. In order to cause another number to glow separately, the memory switch 104 is opened to extinguish any cathode glow, and then it is closed. Then another anode group is energized to cause the desired cathode glow.

The present invention provides a compact and efficient cold cathode gaseous indicator device which has memory.

What is claimed is:

1. An electro-optical indicator device including a matrix of separate and distinct operating elements,
- each element including light-producing means,
- a plurality of first actuating means associated with each of said light-producing means,
- each actuating means being adapted to turn on the light-producing means with which it is associated,
- the actuating means being electrically connected in different combinations,
- each combination being adapted to energize a different combination of light-producing means,
- each combination of light-producing means providing a different character representation, and
- an auxiliary actuating means in operative relation with each light-producing means,
- the auxiliary actuating means having different electrical characteristics with respect to the associated light-producing means than said first actuating means, the first actuating means causing said light-producing means to glow more readily than said auxiliary actuating means,
- each light-producing means comprising a cold cathode glow element,
- said first actuating means comprising a plurality of anode electrodes and said auxiliary actuating means operating in the nature of anode electrodes.

2. The device defined in claim 1 wherein the spacing between the light-producing means and the first actuating means is substantially uniform and the same in each operating element.

3. The device defined in claim 1 wherein each combination of first actuating means is coupled to a single terminal whereby a single operating potential may be applied to each of the actuating means in a combination at the same time, and all of said auxiliary actuating means are connected together and to a single operating potential.

4. The device defined in claim 1 wherein the spacing between each light-producing cold cathode gaseous glow element and its first actuating means is smaller than the spacing between it and its associated auxiliary actuating means.

5. A cold cathode gaseous indicator tube including a plurality of separate and isolated gas cells each including an ionizable gas, a cathode means, and a first anode means comprising a plurality of similar electrodes all spaced equidistantly from the associated cathode means,
- each cell being adapted to exhibit cathode glow when a suitable electrical potential is coupled between its cathode means and one of the electrodes comprising its first anode means,
- each cell also including auxiliary anode means being spaced farther away from the associated cathode means than the first anode means and having different electrical characteristics with respect to the associated cathode than the first anode means whereby the first anode means causes its associated cathode to glow more readily than the auxiliary anode does, the auxiliary anode being able to maintain cathode glow once it has been established by the first anode means.

6. The tube defined in claim 5 and including means coupling selected ones of said cells into groups, each group of cells when glowing providing a representation of a character.

7. A cold cathode gaseous indicator tube including an envelope, a body of insulating material in said envelope, a plurality of separate cells in said body each including a cathode means, a first anode means comprising a plurality of similar electrodes spaced equidistantly from the associated cathode means, and a quantity of an ionizable gas, each cell being adapted to exhibit cathode glow when a proper electrical potential is coupled between its cathode and one of the electrodes comprising its first anode means, each cell also including auxiliary anode means being spaced farther away from the associated cathode means than the first anode means and having different electrical characteristics with respect to the associated cathode than the first anode means whereby the first anode means causes its associated cathode to glow more readily than the auxiliary anode does, the auxiliary anode being able to maintain cathode glow once it has been established by the first anode means.

8. The tube defined in claim 7 and including means in said tube coupling selected ones of said cells in groups, each group when glowing representing a distinct character.

9. A cold cathode gaseous indicator tube comprising an envelope containing a gas atmosphere suitable for providing cathode glow, a plurality of glow cathode elements, each element being adapted to display cathode glow by itself, a group of one or more first anode elements associated with each of said cathode elements, selected ones of said first anode elements being connected together to constitute a single anode for a selected group of cathode elements which together represent a single character, and an auxiliary anode means associated with each glow cathode element and having different electrical characteristics with respect to the associated cathode than the first anode elements whereby the first anode elements cause the associated cathode to glow more readily than the auxiliary anode does, the auxiliary anode being able to maintain cathode glow once it has been established by the first anode.

10. A cold cathode gaseous indicator tube comprising an envelope containing a gas atmosphere suitable for promoting cathode glow, a plurality of glow cathodes each of which is adapted to exhibit cathode glow by itself, said cathodes being positioned so that their regions of glow are in substantially the same plane, a plurality of first anodes associated with each of said cathodes, said first anodes being electrically connected in groups whereby the cathodes are also connected in groups with each group having a separate character representation, each group of anodes having a lead whereby an operating potential may be coupled thereto to cause the corresponding group of cathodes to glow, and an auxiliary anode associated with each glow cathode and having different electrical characteristics with respect to the associated cathode than the first anodes whereby the first anodes cause the associated cathode to glow more readily than the auxiliary anode does, the auxiliary anode being able to maintain cathode glow once it has been established by a first anode.

11. A cold cathode gaseous indicator tube comprising an envelope containing a gas atmosphere suitable for supporting cathode glow and including a face plate, an insulating plate within said envelope and having a plurality of channels extending therethrough, a cathode glow element positioned in each channel, said first plate carrying a plurality of groups of first anode electrodes, each group of first anode electrodes being aligned with one of the channels in the first insulating plate, means interconnecting selected anode elements to form groups of anode elements with each group of anode elements thus being adapted to energize a selected combination of cathode electrodes to provide a character representation, and an auxiliary anode electrode associated with each cathode element and having different electrical characteristics with respect to the associated cathode than the first anodes whereby the first anodes cause cathode glow more readily than the auxiliary anode does, the auxiliary anode being able to maintain cathode glow once it has been established by a first anode.

12. The tube defined in claim 11 including a screen electrode positioned in each channel above the cathode contained therein.

13. The tube defined in claim 11 wherein said first anodes and said auxiliary anodes comprise metal pins embedded in said insulating plate.

14. The tube defined in claim 11 wherein each group of first anode electrodes lies closer to the associated cathode glow element than the auxiliary anode electrode.

15. A cold cathode gaseous indicator tube comprising an envelope containing a gas atmosphere suitable for supporting cathode glow and including a viewing window, an insulating plate within said envelope and having a plurality of channels formed therein, a cathode glow element positioned in each channel, said insulating plate carrying a plurality of groups of first anode electrodes, each group of first anode electrodes being aligned with one of the channels in the first insulating plate and the anode electrodes of each such group being spaced equidistantly from its associated cathode, an auxiliary anode electrode carried by said plate in each of said channels, the auxiliary anode being more remote from the associated cathode glow element than the associated group of first anode electrodes, and means interconnecting selected anode elements to form a plurality of anode selection circuits each being adapted to energize a selected combination of cathode electrodes having a character representation.

16. The tube defined in claim 15 wherein all of the first anode electrodes in a group are disposed equidistantly from the cathode associated with such group.

17. A cathode glow indicator tube including an envelope containing a gaseous atmosphere capable of sustaining a glow discharge contiguous a cathode surface, a plurality of electrode groups within said envelope each including a cathode electrode, a plurality of first anode electrodes, and an auxiliary anode electrode, the first anode electrodes of each such group being disposed equidistantly from the cathode associated with such group, each auxiliary anode being disposed farther from the associated cathode than the first anode electrodes, and a plurality of electrical conductors within said envelope each connecting together a plurality of the anode electrodes associated with different ones of said cathodes to form a plurality of distinct electrical selection circuits each adapted to energize a selected combination of said cathodes to exhibit a visible character.

18. A cathode glow indicator tube as defined in claim 17 in which the cathode electrodes are arranged in the shape of a character, so that the selective energization of said circuits causes different character patterns to be displayed.

19. A cathode glow indicator tube including an envelope having a translucent viewing window and containing a gaseous atmosphere capable of sustaining a cathode glow discharge, cathode means within said envelope having a plurality of glow regions, a plurality of first anode electrode groups within said envelope each including a plurality of anode electrodes disposed equidistantly from one of said glow regions, each of said anode electrodes being capable when energized of establishing a cathode glow over the entire area of its associated glow region, an auxiliary anode electrode associated with each glow region but spaced farther therefrom than the associated first anode electrodes, and a plurality of electrical conductors each connecting together a plurality of the anode electrodes associated with different ones of said cathodes to form a plurality of distinct electrical selection circuits each adapted when energized to establish a cathode glow over a selected combination of said cathode glow regions to exhibit a character visible through said translucent viewing window.

References Cited by the Examiner

UNITED STATES PATENTS

| | | | |
|---|---|---|---|
| 2,783,408 | 2/1957 | Williams et al. | 313—109.5 |
| 2,925,530 | 2/1960 | Engelbart | 315—169 |
| 2,958,009 | 10/1960 | Bowerman | 315—316 X |
| 2,966,616 | 12/1960 | Mash | 313—109.5 X |
| 3,042,823 | 7/1962 | Willard | 315—169 |
| 3,075,119 | 1/1963 | Botden et al. | 313—210 X |

ROBERT SEGAL, *Primary Examiner.*